(12) United States Patent
Denk et al.

(10) Patent No.: US 7,263,338 B2
(45) Date of Patent: Aug. 28, 2007

(54) DEVICE AND METHOD FOR REGULATING A TRANSMISSION MOMENT OF A CONTINUOUS TRANSMISSION SIGNAL

(75) Inventors: Robert Denk, Grafing (DE); Dietmar Wenzel, München (DE); Robert Würth, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/508,816

(22) PCT Filed: Feb. 21, 2003

(86) PCT No.: PCT/DE03/00545

§ 371 (c)(1),
(2), (4) Date: Aug. 10, 2005

(87) PCT Pub. No.: WO03/081807

PCT Pub. Date: Oct. 2, 2003

(65) Prior Publication Data

US 2006/0015640 A1    Jan. 19, 2006

(30) Foreign Application Priority Data

Mar. 25, 2002  (DE) .............................. 102 13 262

(51) Int. Cl.
| H04B 1/40 | (2006.01) |
| H04B 1/04 | (2006.01) |
| H01Q 11/12 | (2006.01) |
| H04L 27/00 | (2006.01) |

(52) U.S. Cl. .................. 455/125; 455/126; 455/77; 375/295

(58) Field of Classification Search ................ 455/125, 455/126, 77
See application file for complete search history.

(56) References Cited

U.S. PATENT DOCUMENTS

| 3,813,496 | A | | 5/1974 | Maillet |
| 5,739,762 | A | * | 4/1998 | Kuramatsu et al. .... 340/825.21 |
| 5,914,757 | A | | 6/1999 | Dean et al. |
| 5,920,557 | A | * | 7/1999 | Hirata ........................ 370/350 |
| 6,388,997 | B1 | * | 5/2002 | Scott .......................... 370/280 |

(Continued)

FOREIGN PATENT DOCUMENTS

DE    195 25 426 C1    11/1996

(Continued)

OTHER PUBLICATIONS

International Search Report, Int'l Application No. PCT/DE03/00545, Int'l Filing Date Feb. 21, 2003, 2 pgs.

*Primary Examiner*—Nay Maung
*Assistant Examiner*—Andrew Wendell
(74) *Attorney, Agent, or Firm*—Eschweiler & Associates, LLC

(57) ABSTRACT

A comparator unit is used to compare an actual transmission time signal with a nominal transmission time signal and to produce a difference signal from the discrepancy, from which difference signal a correction signal is produced in a control unit. This correction signal is used to control a correction unit, which compresses or extends an applied input data signal, thus changing the phase angle of the output data signal so as to minimize the discrepancy between the transmission times. The discrepancy is corrected independently of the system clock, and the correction speed is set variably.

21 Claims, 3 Drawing Sheets

U.S. PATENT DOCUMENTS

| | | | |
|---|---|---|---|
| 6,665,308 B1* | 12/2003 | Rakib et al. | 370/441 |
| 6,687,321 B1* | 2/2004 | Kada et al. | 375/376 |
| 6,747,998 B1* | 6/2004 | Enari | 370/516 |
| 2002/0114356 A1* | 8/2002 | Morita et al. | 370/503 |
| 2003/0174757 A1* | 9/2003 | Partyka | 375/132 |
| 2004/0152438 A1* | 8/2004 | Yamauchi et al. | 455/343.1 |

FOREIGN PATENT DOCUMENTS

| | | |
|---|---|---|
| DE | 197 16 344 C2 | 11/1998 |
| DE | 198 58 358 A1 | 6/2000 |
| EP | 1 033 831 A2 | 9/2000 |
| WO | WO99/33207 A1 | 7/1999 |

* cited by examiner

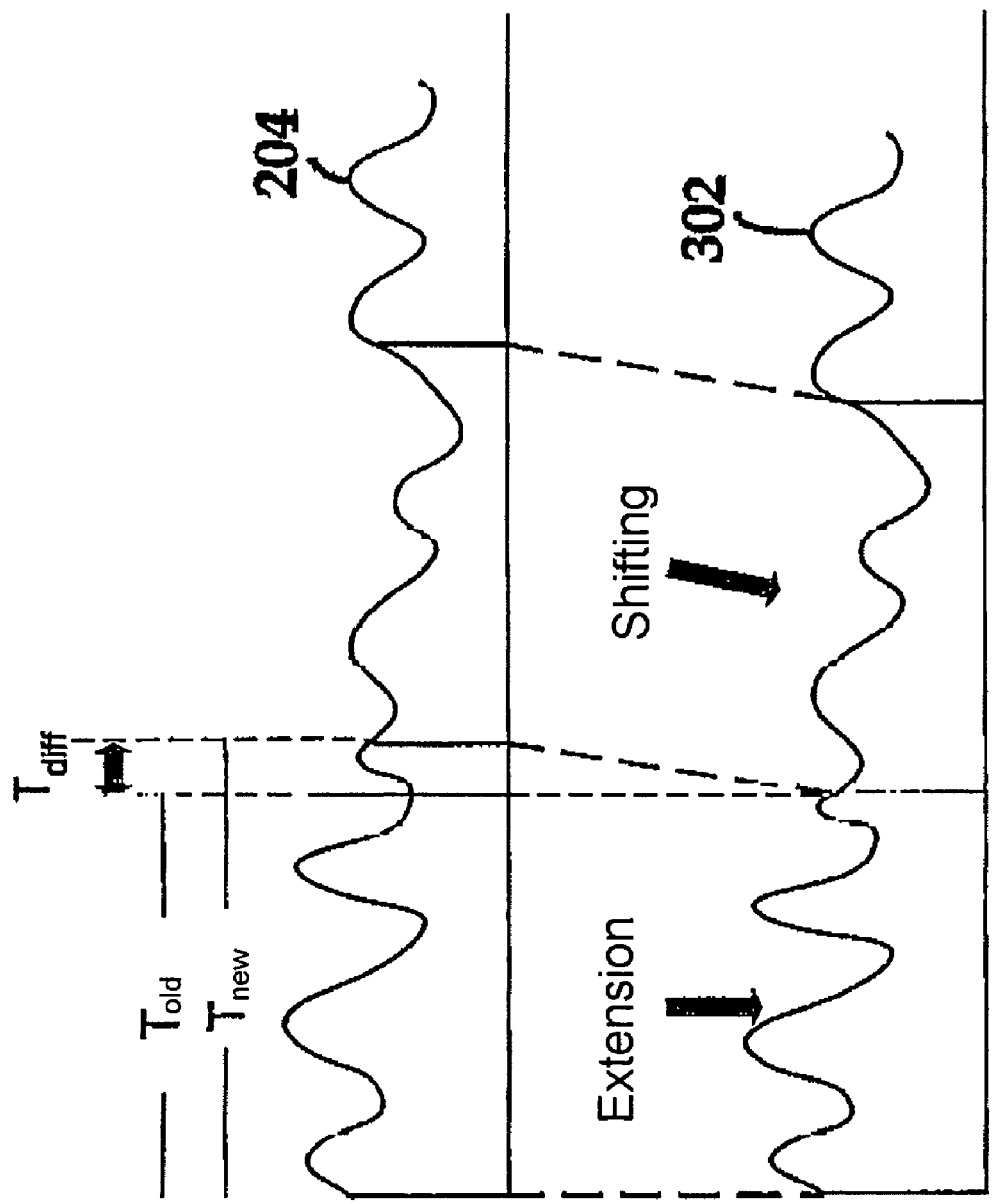

DEVICE AND METHOD FOR REGULATING A TRANSMISSION MOMENT OF A CONTINUOUS TRANSMISSION SIGNAL

RELATED APPLICATION

This application is a national stage application of International Application No. PCT/DE03/00545 filed Feb. 21, 2003, which is entitled "DEVICE AND METHOD FOR REGULATING A TRANSMISSION MOMENT OF A CONTINUOUS TRANSMISSION SIGNAL", which was not published in English, and claims priority to German Patent Application Serial No. 102 13 262.3, which was filed on Mar. 25, 2002, which is hereby incorporated by reference in its entirety.

FIELD OF THE INVENTION

The invention relates to a device for controlling the transmission time of a continuous transmission signal, in particular of a transmission signal in a radio station. The invention also relates to a method for controlling the transmission time of a continuous transmission signal.

BACKGROUND OF THE INVENTION

In radio communications systems, for example the second generation European Mobile Radio System GSM (Global System for Mobile Communication), information (speech, images or other data) is transmitted via a radio interface with the aid of electromagnetic waves. The radio interface relates to a connection between a base station and one or more subscriber stations, in which case the subscriber stations may be mobile stations or fixed-position radio stations. The electromagnetic waves are in this case emitted at carrier frequencies which are in a frequency band specified for the respective system. Frequencies in the frequency band around 2000 MHz have been provided for future radio communications systems, for example the UMTS (Universal Mobile Telecommunications System) or other third generation systems. Two modes are envisaged for this third mobile radio generation, with one mode being referred to as FDD (Frequency Division Duplex) operation, and the other mode being referred to as TDD (Time Division Duplex) operation. Both modes support a so-called CDMA subscriber separation method (Code Division Multiple Access).

In the case of radio stations, particularly in the case of mobile stations for digital mobile radio, which, for example, support the GSM or UMTS standard, one major precondition is the capability to set the transmission time of the transmission signal. This is necessary in order to comply with the time references specified in the respective Standard.

For example, the transmission time of a mobile station is determined by the base station to which the mobile station has been synchronized. The transmission time of the mobile station is in this case corrected with respect to the data received from the base station. No information may be added to or removed from the transmission signal during the correction of this transmission time. This is associated with the requirement that only relatively minor corrections may be carried out to a symbol to be transmitted, and that large sudden time changes during the correction of the transmission time of the transmission signal must be avoided.

Furthermore, the rate of change with which a correction must be carried out is specified in the respective Standard, and must be complied with during the correction. In order to match the transmission time of the transmission signal to the nominal transmission time as well as possible, it is necessary to minimize the phase fluctuations in the signals, for example the so-called jitter, which refers in general to phase fluctuations.

German Laid-Open Specification DE 198 58 358 A1 discloses a method for time synchronization of radio stations in a radio communications system, in which case the radio stations may be base stations or moving mobile stations. The matching between the radio stations is carried out alternately. A second radio station receives transmissions from at least one first adjacent radio station via a radio interface. This second radio station uses the received transmissions to determine a reception time, and compares this reception time with the transmission time of its own transmissions. The result of the comparison is transmitted as synchronization information to the first radio station, which once again matches its own transmission time to the transmission time of the second radio station, in the sense of the received synchronization information.

This method is complex, and both the transmission time and reception time must be changed and taken into account in each of the radio stations.

A further method for synchronization of the timebase of a receiving unit to the timebase of a transmitting unit in a telecommunications device is known from German Laid-Open Specification DE 195 25 426 C1. The receiving unit and the transmitting unit may each be a base station or a mobile station, and may be used for signal transmission. The base station and mobile station timebases, which are generally not the same as one another, are continuously synchronized while a connection is in existence, in order to neutralize this discrepancy. The transmitting unit transmits synchronization data, for example a synchronization word, for clock recovery, and data for synchronization of the receiving unit, in each channel time slot of a transmission frame in a data burst to the receiving unit. The data received in the receiving unit is compared until the correct synchronization data is identified. The actual synchronization bit contained in the received synchronization word is determined, and its position is compared by means of a comparator with the nominal synchronization bit, which is used as a reference bit in the receiving unit. If the two bit positions differ, the comparator produces an error signal. An error counting unit, which is connected downstream from the comparator, counts the error signals in a predetermined time period, which is governed by the clock frequency for data burst transmission, and by the number of counting steps of a frame counting device. The time sequence of the error signals that are determined is a measure of the difference between the timebases of the receiving unit and of the transmitting unit. The receiving unit uses the number of stored error signals to produce a correction signal, which is used for synchronization during reception during a connection, or during a connection interruption in the event of reception failure.

The synchronization of the timebases of the receiving unit and of the transmitting unit in the known method is relatively complex, and relatively inaccurate.

SUMMARY OF THE INVENTION

The invention is directed to providing a device and a method of the type mentioned initially, in which the transmission time can be synchronized easily, highly accurately and highly reliably.

A device according to the invention for controlling the transmission time of a continuous transmission signal, that is to say of a signal without a data burst, in a transmitting/ receiving unit, in particular a transmission signal from a radio station, has a correction unit which produces an output data signal. This correction unit is electrically connected to a downstream sequence control unit, which produces a working clock signal which is applied to a downstream counter unit. The counter unit generates an actual transmission time signal. A control device, which is connected downstream from the counter unit, uses the actual transmission time signal and an external nominal transmission time signal to produce a correction signal, which is applied to the correction unit in order to correct the actual transmission time.

This means that the transmission time can be set highly accurately and highly reliably. A further advantage is that the absolute transmission time can be set independently of the receiver assembly in the transmitting/receiving unit, explicitly only in the transmitter assembly of the transmitting/ receiving unit. Likewise, no readjustment of the frequency of the system oscillator which is specified in accordance with the transmission standard is required, so that there is no need for a change both to the transmission times and to the reception times of the signals, and there is hence no need for any change relating to this in the receiver.

In one preferred exemplary embodiment, the control device has a comparator unit, to whose inputs the actual transmission time signal and the nominal transmission time signal are applied, and the comparator unit output signal is a difference signal which contains information about the discrepancy between the two transmission times. It is particularly advantageous for the comparator unit to be designed as a subtractor, for example as a comparator.

One particularly advantageous refinement is characterized in that the control device has a control unit, in particular a microprocessor, which is connected downstream from the comparison unit, with the difference signal being applied to one input of the control unit, and with the control unit producing the correction signal as an output signal.

This means that the correction speed can be set such that the correction is carried out within the time period specified by the respective standard, for example, UMTS. Furthermore, this makes it possible to match the data stream to be transmitted, that is to say the transmission signal, as accurately as possible and with as little jitter as possible to the nominal transmission time, which is used as a reference and is known from the data received from another radio station, for example a base station. A further advantage is that this makes it possible to correct the actual transmission time without any large sudden time changes, so that only small portions of a symbol to be transmitted are corrected.

The correction unit is preferably a fractional sampling rate converter unit with a variable conversion ratio.

In another advantageous embodiment of the invention, the correction unit is followed by a D/A converter, to one of whose inputs the clocked output data signal is applied, and to another of whose inputs a sampling clock signal from a sampling clock source is applied. The D/A converter produces the analog transmission signal as an output signal.

The upstream control unit, which produces exclusively the correction signal for the correction unit and thus does not influence the working clock of the D/A converter, means that the output clock from the D/A converter is virtually jitter-free, so that the transmission spectrum of the analog transmission signal complies with the requirements in the respective standard.

A further preferred refinement is characterized in that a signal processing unit is connected downstream from the counter unit and from the sequence control unit, is connected upstream of the correction unit and produces a transmission signal.

The control device may have a time control unit, which is connected upstream of the comparator unit and transmits the external nominal transmission time signal to the comparator unit. A periodic start signal, whose period duration is defined by the respective radio signal, for example UMTS or GSM, is thus predetermined by this time control unit.

The apparatus has a number of clock domains, that is to say subsystems in the entire device which in general operate using different clocks and are thus not necessarily synchronized to one another. For example, the control device is operated with a clock which is predetermined by the period duration of the nominal transmission time signal by means of the time control unit. The device is simple, has little complexity, and is advantageously designed such that it can operate beyond these limits of the various clock domains.

It is particularly advantageous for the transmitting/receiving unit to be a mobile station which, in particular, supports one of the standards GSM or UMTS.

The invention also includes a method for controlling the transmission time of a continuous transmission signal in a transmitting/receiving unit, in particular a transmission signal in a radio station. An internal actual transmission time signal is produced in the transmitting/receiving unit, and is compared with an external nominal transmission time signal, which is derived from a received signal from the transmitting/receiving unit. A difference signal is produced from the discrepancy between the actual transmission time and the nominal transmission time.

According to the invention, the actual transmission time is corrected only in the transmitting/receiving unit, in particular in the transmission assembly in the transmitting/ receiving unit. The correction is carried out in such a way that the discrepancy between the two transmission times, as contained in the difference signal, is minimized, the correction is carried out independently of the defined clock period of the basic radio system, and the time period for the correction is set variably.

This allows the transmission time of the transmission signal to be adjusted relatively easily and quickly, and allows synchronization of the transmission times with high accuracy and reliability.

It is particularly advantageous to set the time duration of the correction by the capability to vary the duration for which the conversion ratio of a sampling rate converter unit differs from the normal value.

In one particularly preferred exemplary embodiment, the discrepancy between the transmission times is minimized by compressing or extending the input data signal in time.

In one advantageous embodiment of the method, this compression or extension of the input data signal is carried out by reducing or increasing the conversion ratio of the fractional sampling rate converter unit.

A correction signal is preferably applied to the fractional sampling rate converter unit in order to change the conversion ratio such that it is set either to a fixed value, which is predetermined for a steady state of the system, or to a value which corresponds to extension or compression of the input data signal.

One particularly advantageous refinement is characterized in that the value to which the conversion ratio is changed, the time period for which the changed conversion ratio is activated, and the time at which the changed conversion ratio is activated are contained and transmitted as information in a single correction signal.

This means that the actual transmission time of the transmission signal can be matched as exactly as possible and without jitter to the nominal transmission time, and that the correction of the transmission signal, as well as the transmission spectrum of the transmission signal, satisfy the conditions specified by the respective standard.

BRIEF DESCRIPTION OF THE DRAWINGS

One exemplary embodiment of the invention will be explained in more detail in the following text with reference to schematic drawings, in which:

FIG. 3 shows signal profiles of an input data signal and of a compressed output data signal.

DETAILED DESCRIPTION OF THE INVENTION

Figure 1:
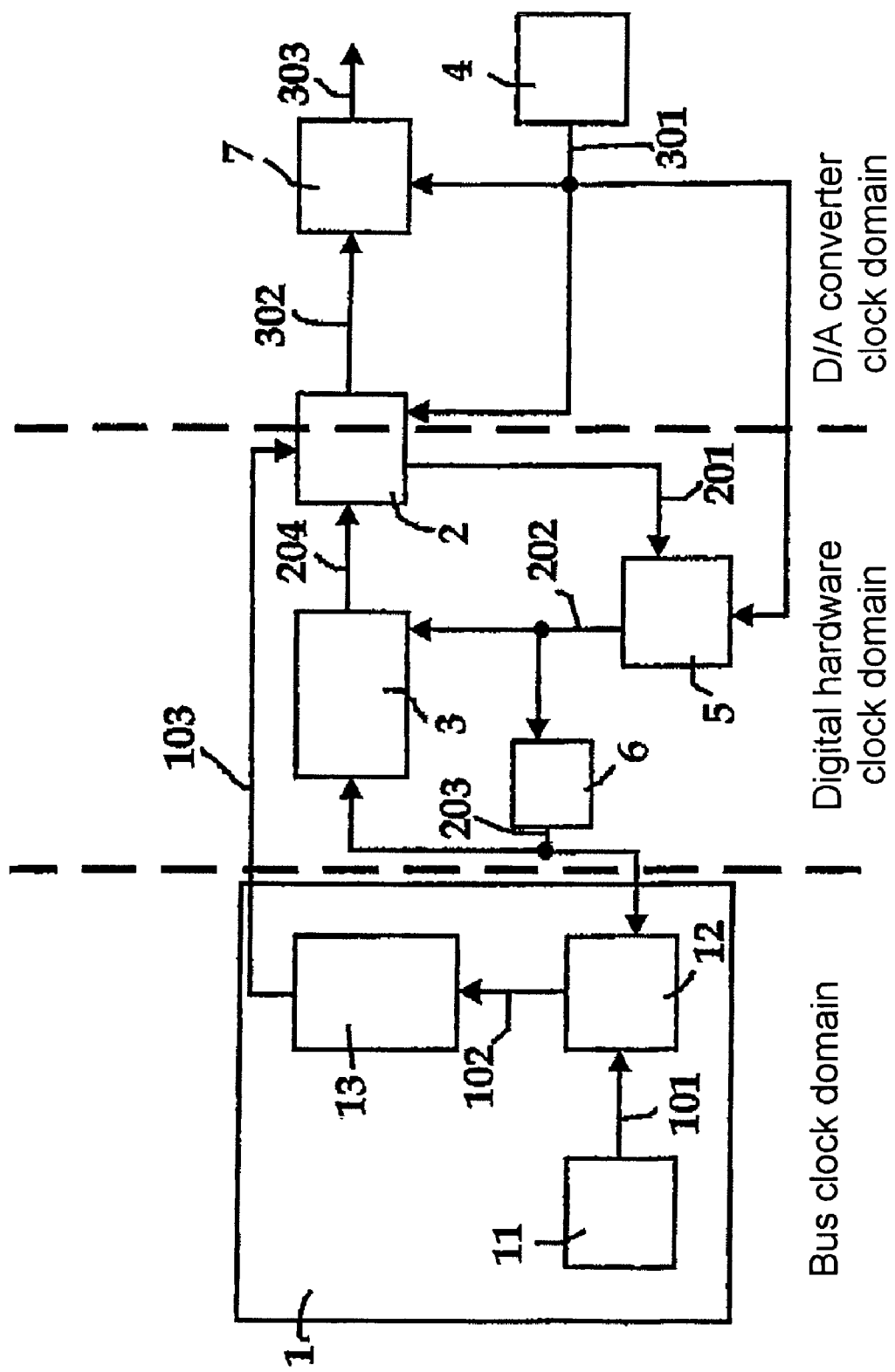
FIG. 1 shows a block diagram of a device according to the invention.

A device according to the invention has a control device (FIG. 1). The control device 1 has a time control unit 11 with a downstream comparator unit 12 which, in the exemplary embodiment, is a subtractor 12. Furthermore, the control device 1 has a control unit 13, which is connected downstream from the comparator unit 12. The control device 1, in particular the control unit 13, is electrically connected via a first input to a correction unit 2 which, in the exemplary embodiment, is a sampling rate converter unit. The sampling rate converter unit 2 is connected via a second input to an upstream signal processing unit 3. A sampling clock source 4 is electrically connected to the sampling rate converter unit 2 at a third input. The sampling rate converter unit 2 has an electrical connection for a downstream sequence control unit 5 via a first output. The sequence control unit 5 is also connected via a second input to the upstream sampling clock source 4. The output of the sequence control unit 5 is electrically connected firstly to one input of the signal processing unit 3 and secondly to one input of a counter unit 6. The output of this counter unit 6 is electrically connected firstly to one input of the signal processing unit 3 and secondly to one input of the comparator 12. The sampling rate converter unit 2 is followed by a D/A converter 7, whose second input is also connected to the sampling clock source 4. FIG. 1 illustrates only those components of a transmitter assembly in the transmitting/receiving unit which are significant to the invention.

The method of operation of the device for controlling the absolute transmission time of a continuous transmission signal will be explained in more detail in the following text. The time control unit 11 contains information about the nominal transmission time, which is predetermined by the basic system, for example UMTS or GSM. This information is transmitted by means of a signal to the transmitting/receiving unit. The time control unit 11 produces a periodic start signal, the nominal transmission time signal 101, which is applied to the subtractor 12. The period duration of the nominal transmission time signal 101 is in this case predetermined by the appropriate mobile radio system, for example UMTS or GSM. The sampling clock source 4 furthermore produces a sampling clock signal 301. The sampling clock should be regarded as the clock frequency at which a digital/analog (D/A) converter, in this case the D/A converter 7, is operated, or would have to be operated at in order to convert a signal from the digital domain to the analog domain.

This sampling clock signal 301 is applied to the sequence control unit 5. The sequence control unit 5 uses the sampling clock signal 301 and a control signal 201 that is produced by the sampling rate converter unit 2 to produce a working clock signal 202. The working clock is the clock used by the registers in the digital assemblies. The sampling clock is an undefined fractional ratio of the working clock, which is used as the basis for the signal processing unit 3. The working clock signal 202 is transmitted both to the signal processing unit 3 and to the counter unit 6. The counter unit 6 counts the working clock cycles contained in the working clock signal 202, for example by counting the edges of the working clock signal 202, and uses this to generate an actual transmission time signal 203. The actual transmission time signal 203 is a periodically recurring signal, which is generated by the counter unit 6 whenever a new transmission frame starts. This actual transmission time signal 203 is applied to one input of the comparator 12 and to one input of the signal processing unit 3.

The working clock is produced by the sequence control unit 5 in such a way that the signal processing unit 3 produces sample values, to be precise exactly at the required input-side sampling rate of the sampling rate converter unit 2. The sample values are transmitted to the sampling rate converter unit 2 with the aid of the data signal 204.

The subtractor 12 uses the transmission time signals 101 and 203 which are applied to its inputs to determine a time difference, which corresponds to the discrepancy between the actual transmission time and the nominal transmission time. This discrepancy is included as information in a difference signal 102 which is transmitted to the control unit 13. The difference signal 102 may be transmitted to the control unit 13 on the one hand by regular checking of the comparator 12 by the control unit 13. On the other hand, it may also be carried out by the control unit 13 triggering an interrupt request.

The magnitude of the discrepancy between the transmission times and the speed at which the discrepancy is changing are determined in the control unit 13 from the data information in the difference signal 102. The control unit 13 uses this information to produce a correction signal 103. The correction signal 103 contains information about the value to which a sampling rate ratio of the sampling rate converter unit 2 is changed, as well as the time period for which this changed sampling rate ratio is activated, and the time at which this activation is started. The expression sampling rate ratio means the conversion ratio of the fractional sampling rate converter unit 2, which is defined by the ratio of the output sampling rate to the input sampling rate. This correction is used to minimize the discrepancy between the two transmission times. The correction is in this case carried out independently of the defined clock duration of the basic radio system, for example UMTS or DSM, and independently of the receiver assembly the correction is in this case carried out exclusively in the transmitter assembly in the mobile station, independently of the defined time duration for the basic radio system, for example, UMTS or GSM, and independently of the receiver assembly in the mobile station. The rate at which the correction is carried out is set variably, with the rate being set as a function of the value of the sampling rate ratio and of the time duration of the activated state in which this ratio is activated.

The correction signal 103 is transmitted from the control unit 13 to the sampling rate converter unit 2. The correction signal 103 is in this case transmitted from a clock domain of the transmitter assembly in the mobile station, in the bus clock domain (which is characterized by the control device 1 and is clocked with a clock duration which is predetermined by the time control unit 11) to a second clock domain in the transmitter assembly, the digital hardware clock domain. The control unit 13 thus predetermines the time at which the sampling rate converter unit 2 is driven.

The correction signal 103 is evaluated in the sampling rate converter unit 2, and the sampling rate converter unit 2 produces the clock control signal 201, which is used as the control signal for internal sequence control, as a function of the changed sampling rate ratio or conversion ratio. The digital hardware clock domain has a clock which is different, and is in general not synchronized to the clock for the bus clock domain.

The sampling rate ratio or conversion ratio of the sampling rate converter unit 2 has a permanently set ratio when it is in the steady state, during which no correction is carried out for the time discrepancy between the transmission times.

If the sampling rate ratio is increased, then fewer data items are read in each time unit at the defined sampling clock rate. This means that the input data signal 204 which is transmitted from the signal processing unit 3 to the sampling rate converter unit 2 is extended, and that subsequent signal components of the input data signal 204 are shifted backwards in time. During production of the input data signal 204, the mean edge frequency of the working clock signal 202 is an integer multiple of the mean data rate of the input data signal 204. The clocked output data signal 302 from the sampling rate converter unit 2 is thus extended in comparison to the input data signal 204. In this case, in general, the input data signal 204 is clocked differently than the output data signal 302. The output data signal 302 is processed further in a third clock domain, the D/A converter clock domain in the mobile station, which in general uses a different clock than the bus and digital hardware clock domains.

When the sampling ratio is reduced, the output data signal 302 is compressed in comparison to the input data signal 204, and subsequent signal components are shifted forwards in time.

The changed sampling rate ratio remains activated until the discrepancy between the transmission times falls below a defined threshold value. Once this has been achieved, the correction signal 103 is deactivated, and the sampling ratio is once again permanently set to the value defined for the steady state.

The digital clocked output data signal 302 is transmitted to the D/A converter unit 7, which produces an analog continuous transmission signal 303 at the non-varying sampling clock rate 301. The phase angle of this continuous analog transmission signal 303 matches the phase angle predetermined by the nominal transmission time signal 101, with the phase angles of the two signals having at most a discrepancy which is within a defined tolerance band. This therefore also results in appropriate correction of the actual transmission time in comparison to the nominal transmission time as a reference time.

The maximum permissible discrepancy between the actual transmission time and the nominal transmission time of the transmission signal can thus be set very accurately by the device and the method. The remaining error is in this case generally dependent on the frequency at which the comparator 12 is checked by the control unit 13, and how the sampling rate converter unit 2 is driven by the control unit 13 by means of the correction signal 103.

The compression or extension of the input data signal 204 by the sampling rate converter unit 2 is carried out in such a way that no information is lost from or added to the input data signal 204.

It is possible for the actual transmission time signal 203 to contain, as information, the count of the counter unit 6 as the actual transmission time.

It is also possible to provide for the counter unit 6 to be periodically reset, and to be reset with the period duration of the nominal transmission time signal 101 when the mobile station is in the steady state.

Figure 2:
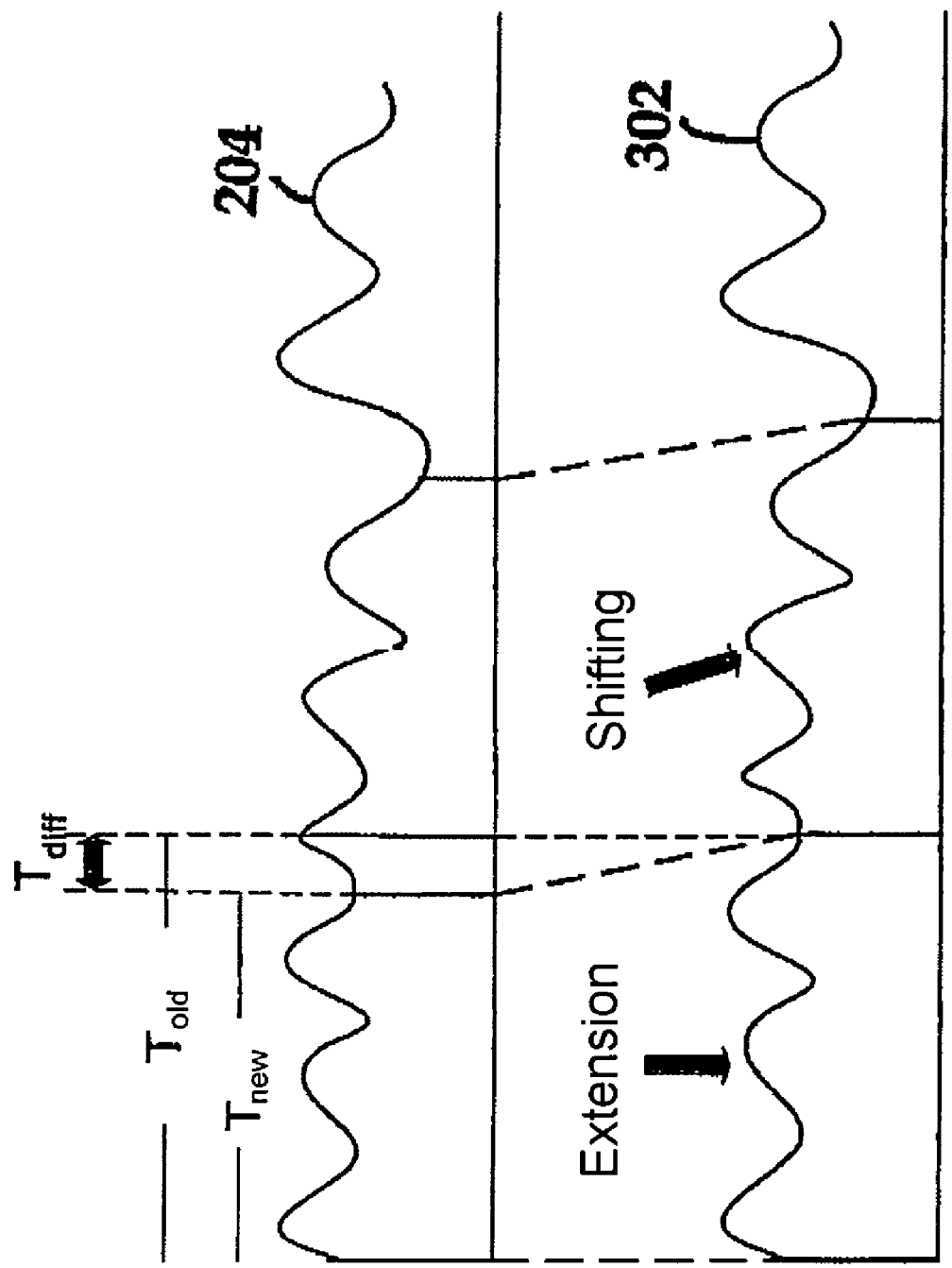
FIG. 2 shows signal profiles of an input data signal and of an extended output data signal.

FIG. 2 shows an example of a signal profile of the input data signal 204. The time discrepancy between the actual transmission time with the time reference $T_{new}$ and the nominal transmission time with the time reference $T_{old}$ is indicated by the time difference $T_{diff}$.

The sampling rate ratio is increased, as a result of which the input data signal 204 is changed in a corresponding manner, and the output data signal 302 has an extended profile. As illustrated in the lower signal profile in FIG. 2, the subsequent signal components are shifted backwards in time.

FIG. 3 likewise shows an example of a signal profile of an input data signal 204 with the reference symbol for the time discrepancy $T_{diff}$, corresponding to that shown in FIG. 2, and with the time references $T_{old}$, $T_{new}$ of the transmission times. In this exemplary embodiment, the sampling rate ratio has been reduced, so that the input data signal 204 has been changed in a corresponding manner, and the output data signal 302 has a compressed signal profile. The subsequent signal components are shifted forwards in time.

The device according to the invention and the method make it possible to easily set a transmission time for a continuous transmission signal. The correction for any discrepancy between the actual transmission time and the nominal transmission time is carried out only in the transmission assembly in the mobile station, and is set with high accuracy and reliability over a number of clock domains within the transmission assembly. The correction is carried out independently of the system clock and of the rate at which the discrepancy is changing, with the discrepancy between the transmission times being determined by a comparator unit, in particular a comparator 12, and the correction unit which is used for correction, in particular the sampling rate converter unit 2, being controlled by the control unit 13. The correction is carried out in conjunction with the counter unit 6 and with the sequence control unit 5, in accordance with the requirements specified by the respective standard, for example UMTS or GSM.

The invention claimed is:

1. A device for controlling an absolute transmission time of a continuous transmission signal in a transmitting/receiving unit comprising:

a correction unit configured to produce an output data signal based on a received correction signal, wherein the correction unit comprises a fractional sampling rate converter unit comprising a variable sampling rate conversion ratio, wherein the fractional sampling rate converter unit comprises a first input configured to receive an input data signal having an input sampling rate, and an output configured to output the output data signal having an output sampling rate, and a second input configured to receive the correction signal and adjust the sampling rate conversion ratio thereof based on the correction signal, a sequence control unit connected downstream from the correction unit and configured to produce a working clock signal, a counter unit electrically connected to the sequence control unit and configured to use the working clock signal from the sequence control unit to generate an internal actual transmission time signal, and a control device configured to compare the internal actual transmission time signal with an external nominal transmission time signal to produce the correction signal, and further configured to transmit the correction signal to the correction unit in order to correct the actual transmission time.

2. The device as claimed in claim 1, wherein the control device comprises a comparator unit configured to compare the actual transmission time signal with the nominal transmission time signal, and produce a difference signal from a discrepancy between two transmission times associated with the actual and nominal transmission time signals.

3. The device as claimed in claim 2, wherein the control device comprises a control unit connected downstream from the comparator unit and configured to use the difference signal generated by the comparator unit from the comparison of the actual transmission time signal with the nominal transmission time signal, to produce the correction signal.

4. The device as claimed in claim 2, wherein the control device comprises a time control unit connected upstream of the comparator unit and configured to transmit the external nominal transmission time signal to the comparator unit.

5. The device as claimed in claim 1, wherein the correction unit comprises a fractional sampling rate converter unit with a variable conversion ratio.

6. The device as claimed in claim 1, further comprising a signal processing unit configured to produce an input data signal connected downstream from the counter unit and from the sequence control unit, and connected upstream of the sampling rate converter unit.

7. The device as claimed in claim 1, further comprising a D/A converter connected downstream from the sampling rate converter unit and configured to produce an analog transmission signal as a function of the output data signal and of a sampling clock signal from a sampling clock source.

8. The device as claimed in claim 1, wherein the transmitting/receiving station comprises a mobile station which supports one of the standards UMTS or GSM.

9. A method for controlling the transmission time of a continuous transmission signal in a transmitting/receiving unit, comprising:

a) producing an internal actual transmission time signal in the transmitting/receiving unit, containing information about an actual transmission time, b) comparing the internal actual transmission time signal with an external nominal transmission time signal which is received at the transmitting/receiving unit and which contains information about a nominal transmission time, c) producing a difference signal in the transmitting/receiving unit, which contains information about a discrepancy between the two transmission times associated with the actual and nominal transmission time signals, and d) correcting the actual transmission time in the transmitting/receiving unit such that the discrepancy between the two transmission times, contained in the difference signal, is minimized, wherein the correction is carried out independently of a defined clock period of the transmitting/receiving unit, and wherein a time period for the correction is set variably therein, and wherein a time duration of the correction is set by a value of a conversion ratio of a fractional sampling rate of an input data signal, and an output data signal respectively.

10. The method as claimed in claim 9, wherein the discrepancy between the transmission times is minimized such that the input data signal is compressed or extended in time.

11. The method as claimed in claim 10, wherein the input data signal is compressed or extended in time by reducing or increasing the conversion ratio of the fractional sampling performed on the input data signal.

12. The method as claimed in claim 11, wherein correcting the actual transmission time comprises applying a correction signal to a fractional sampling rate converter unit to change the conversion ratio associated therewith such that the conversion ratio is set either to a value which is predetermined and fixed for a steady-state system, or to a value which corresponds to the extension or compression of the input data signal.

13. The method as claimed in claim 12, wherein the correction signal contains, as information, a value to which the conversion ratio is changed, a time period for which the changed conversion ratio is used, and a time at which the changed conversion ratio is activated.

14. The method as claimed in claim 13, further comprising deactivating the correction signal if the time discrepancy is less than a threshold value, and setting the conversion ratio to a value defined for the steady state.

15. The method as claimed in claim 10, wherein the input data signal is compressed or extended in time such that no information is removed from or added to the input data signal.

16. The method as claimed in claim 9, wherein the actual transmission time is corrected over various clock domains of the transmitting/receiving unit, which have different or identical clock durations, and the external nominal transmission time signal is generated in a clock domain which is different to the clock domain which is clocked by the working clock, and which is not synchronous therewith.

17. The method as claimed in claim 16, further comprising producing a control signal by means of which the working clock in the transmitting/receiving unit is controlled.

18. The method as claimed in claim 9, further comprising counting edges of a working clock signal in order to determine the actual transmission time.

19. The method as claimed in claim 18, wherein the actual transmission time signal is produced based on the determined actual transmission time.

20. The method as claimed in claim 18, further comprising resetting periodically the counting when the transmitting/receiving unit is in the steady state, with a period duration of the nominal transmission time signal.

21. The method as claimed in claim 9, wherein the transmitting/receiving unit comprises a mobile station, and supports a Universal Mobile Telecommunications System or Global System for Mobile Communication mobile radio standard.

* * * * *